Montgomery & Votaw.

Sad Iron.

Nº 97,427. Patented Nov. 30, 1869.

Witnesses:
A. W. Almquist
Geo. W. Mabee

Inventors:
M. W. Montgomery
L. H. Votaw
per
Munn & Co
attorneys

United States Patent Office.

M. W. MONTGOMERY AND E. H. VOTAW, OF SPRINGFIELD, MASSACHUSETTS.

Letters Patent No. 97,427, dated November 30, 1869.

IMPROVED SAD-IRON.

The Schedule referred to in these Letters Patent and making part of the same.

*To all whom it may concern:*

Be it known that we, M. W. MONTGOMERY and E. H. VOTAW, of Springfield, in the county of Hampden, and State of Massachusetts, have invented a new and useful Improvement in Sad-Irons; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Our invention has for its object to furnish an improved sad-iron, which shall be so constructed and arranged that the handle may be readily attached and detached, for convenience in heating and using the sad-iron; and It consists in the detachable handle, constructed and attached to the body of the sad-iron, as hereinafter more fully described.

A is the body of the sad-iron, in the upper side of which is formed two holes or sockets, inclined in opposite directions, to receive the lower ends of the bars B of the handle.

The bars B are pivoted to each other near their lower ends, and in their upper ends are formed holes, to receive the journals of the handle C.

Figure 1:
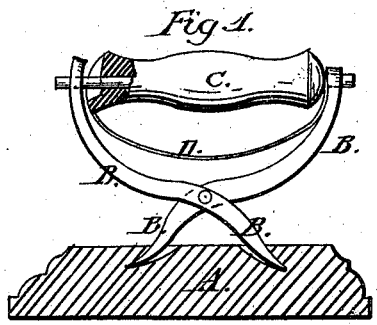
Figure 1 is a longitudinal section of a sad-iron, to which our improvement has been attached, part of the handle being broken away to show the construction.
Figure 2:
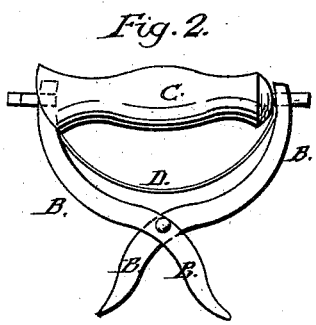
Figure 2 is a side view of the handle, detached from the body of the sad-iron.

One or both ends of the handle C are bevelled off, or have cams formed upon them, as shown in figs. 1 and 2, so that the said handle, when turned in one direction, may force the upper ends of the bars B apart, to lock the handle to the body A, as shown in fig. 1, and, when turned into another position, may release the said upper ends of the said bars, and allow them to be drawn toward each other by the spring D, to unlock the handle, and allow it to be removed from the said body A, as shown in fig. 2.

D is a spring, the ends of which are attached to the bars B, near their upper ends, and which is so formed as to draw the upper ends of the bars B toward each other, when released from the pressure of the cams or inclines of the handle C.

The spring D may be made broad, so as to serve as a fender to protect the hand of the operator from the heat radiated by the body A of the sad-iron.

The spring D also serves to keep the various parts of the handle in their proper relative position when the said handle is detached from the said body A.

Having thus described our invention,

What we claim as new, and desire to secure by Letters Patent, is—

An improved detachable sad-iron handle, formed by the combination of the pivoted bars B, handle C, having cams or inclines formed upon one or both ends, and spring D, with each other, as herein shown and described, and for the purpose set forth.

The above specification of our invention signed by us, this 12th day of June, and 14th day of June, 1869.

M. W. MONTGOMERY.
E. H. VOTAW.

Witnesses for M. W. MONTGOMERY:
   FRANK BLOCKLEY,
   JAMES T. GRAHAM.
Witnesses for E. H. VOTAW:
   GIDEON WELLS,
   E. W. MERRILL.